US012732940B2

(12) United States Patent
Li

(10) Patent No.: US 12,732,940 B2
(45) Date of Patent: Sep. 8, 2026

(54) METHOD FOR DETERMINING POSITIONING REFERENCE SIGNALING CONFIGURATION INFORMATION

(71) Applicant: BEIJING XIAOMI MOBILE SOFTWARE CO., LTD., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 293 days.

(21) Appl. No.: 18/284,474

(22) PCT Filed: Mar. 31, 2021

(86) PCT No.: PCT/CN2021/084606
§ 371 (c)(1),
(2) Date: Sep. 27, 2023

(87) PCT Pub. No.: WO2022/205144
PCT Pub. Date: Oct. 6, 2022

(65) Prior Publication Data
US 2024/0163830 A1 May 16, 2024

(51) Int. Cl.
*H04W 64/00* (2009.01)
*H04L 5/00* (2006.01)
*H04W 76/30* (2018.01)

(52) U.S. Cl.
CPC ........... *H04W 64/00* (2013.01); *H04L 5/0051* (2013.01); *H04W 76/30* (2018.02)

(58) Field of Classification Search
CPC ...... H04W 64/00; H04W 76/30; H04L 5/0051
See application file for complete search history.

(56) References Cited

U.S. PATENT DOCUMENTS 7,684,358 B2 3/2010 Kim et al.
2019/0239181 A1* 8/2019 Gangakhedkar ...... H04W 76/10
2020/0107286 A1 4/2020 Akkarakaran et al.
2022/0353841 A1* 11/2022 Gunnarsson .......... G01S 5/0236
2023/0062805 A1* 3/2023 Baek ..................... H04L 5/0091
2023/0362869 A1* 11/2023 You ....................... H04L 5/0051

FOREIGN PATENT DOCUMENTS

CN 110235482 A 9/2019
CN 111565414 A 8/2020

OTHER PUBLICATIONS

European Patent Application No. 21933809.2 Search Report dated Apr. 23, 2024, 11 pages.
Xiaomi, "R2-2009574 Discussion on PRS enhancements", 3GPP TSG RAN WG2 #112, R2-2009574, Nov. 2020, 3 pages.
Indian Patent Application No. 202347070648 Office Action dated Jan. 15, 2025, 7 pages.
PCT/CN2021/084606, International Search Report dated Dec. 30, 2021, 2 pages.
Xiaomi "Discussion on PRS enhancements" 3GPP TSG RAN WG2 #112, R2-2009574, Nov. 2020, 3 pages.

* cited by examiner

*Primary Examiner* — Muthuswamy G Manoharan
(74) *Attorney, Agent, or Firm* — Cozen O'Connor

(57) ABSTRACT

A method for determining positioning reference signaling (PRS) configuration information is performable by a location management function (LMF) device, and the method includes: sending a PRS configuration information request to a base station via a non-user equipment (UE) associated message or a UE associated message.

19 Claims, 8 Drawing Sheets

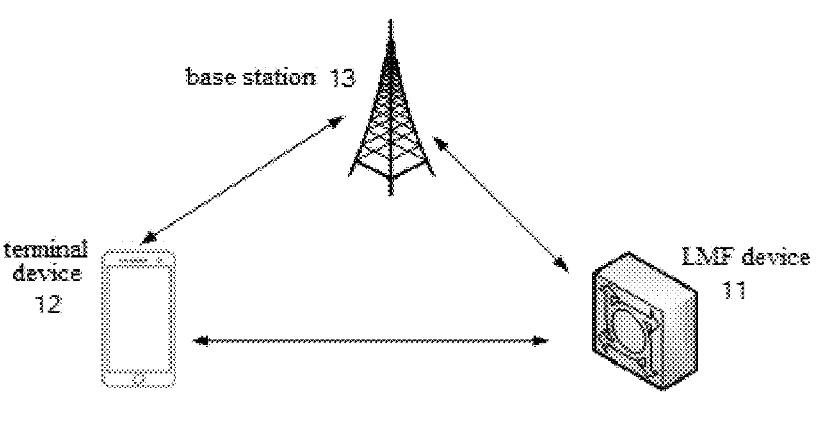

FIG. 1 sending a PRS configuration information request to a base station by a non-UE associated message or a UE associated message — 21

FIG. 2 in response to a number of received on-demand PRS configuration information requests sent by terminal devices being less than or equal to a threshold value, sending the PRS configuration information request to the base station based on the UE associated message — 31 receiving the PRS configuration information returned by the base station through the UE associated message — 32 sending the PRS configuration information to a second specified terminal device, the second specified terminal device being a terminal device that sends an on-demand PRS configuration information request to the LMF device — 33

FIG. 3 sending a PRS configuration information request to a base station by a non-UE associated message or a UE associated message

41 in response to receiving the PRS configuration information returned by the base station through the non-UE associated message, sending first indication information to the base station, in which the first indication information is used to indicate the base station to send the PRS configuration information to the terminal device via a system information block (SIB)

1401
processor
1403
interface
1402
memory

METHOD FOR DETERMINING POSITIONING REFERENCE SIGNALING CONFIGURATION INFORMATION

CROSS-REFERENCE TO RELATED APPLICATION

This application is a U.S. national stage application of International Application No. PCT/CN2021/084606, filed Mar. 31, 2021, the entire contents of which are incorporated herein by reference.

TECHNICAL FIELD

The present disclosure relates to the field of communication technology, and more particularly to a method and apparatus for determining positioning reference signaling configuration information.

BACKGROUND

In a communication system, a terminal device may be positioned through a variety of positioning technologies. For example, the terminal device may implement positioning by measuring positioning reference signaling (PRS).

In the related art, a location management function (LMF) device may send a PRS configuration information request to a base station through a new radio positioning protocol A (NRPPa) message. After receiving the request, the base station sends a response message to the LMF device, and the response message contains PRS configuration information of the base station or a transmission reception point (TRP). After receiving the PRS configuration information, the LMF device may send the PRS configuration information to the terminal device.

The above acquisition manner of the PRS configuration information is single, which is difficult to adapt to the current high-precision and high-reliability requirements of the communication system.

SUMMARY

In a first aspect, embodiments of the present disclosure provide a method for determining positioning reference signaling configuration information, which is configured to be performed by a location management function (LMF) device and includes: sending a PRS configuration information request to a base station via a non-UE associated message or a UE associated message.

In a second aspect, embodiments of the present disclosure provide a method for determining positioning reference signaling configuration information, which is configured to be performed by a terminal device and includes:

- sending an on-demand PRS configuration information request to a network device, in which the network device is an LMF device or a base station; and
- receiving PRS configuration information returned by the network device.

In a third aspect, embodiments of the present disclosure provide a method for determining positioning reference signaling configuration information, which is configured to be performed by a base station and includes: receiving a PRS configuration information request sent by a communication device; and returning PRS configuration information to the communication device. The communication device is an LMF device or a terminal device, and the PRS configuration information request sent by the LMF device is a non-UE associated message or a UE associated message.

BRIEF DESCRIPTION OF THE DRAWINGS

In order to more clearly illustrate the technical solutions in embodiments of the present disclosure or the background technology, drawings that need to be used in embodiments of the present disclosure or the background technology will be described below.

FIG. 1 is a schematic architecture diagram of a communication system provided by embodiments of the present disclosure;

FIG. 2 is a schematic flowchart of a method for determining PRS configuration information provided by embodiments of the present disclosure;

FIG. 3 is a schematic flowchart of a method for determining PRS configuration information provided by embodiments of the present disclosure;

Figure 4:
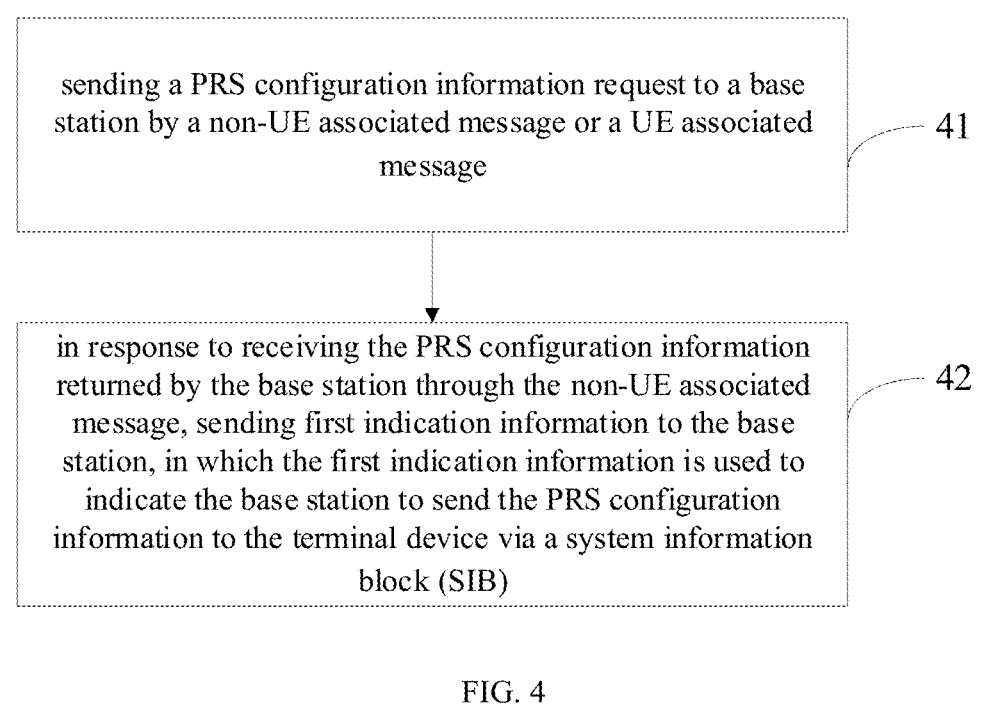

FIG. 4 is a schematic flowchart of a method for determining PRS configuration information provided by embodiments of the present disclosure;

DETAILED DESCRIPTION

Figure 4A:
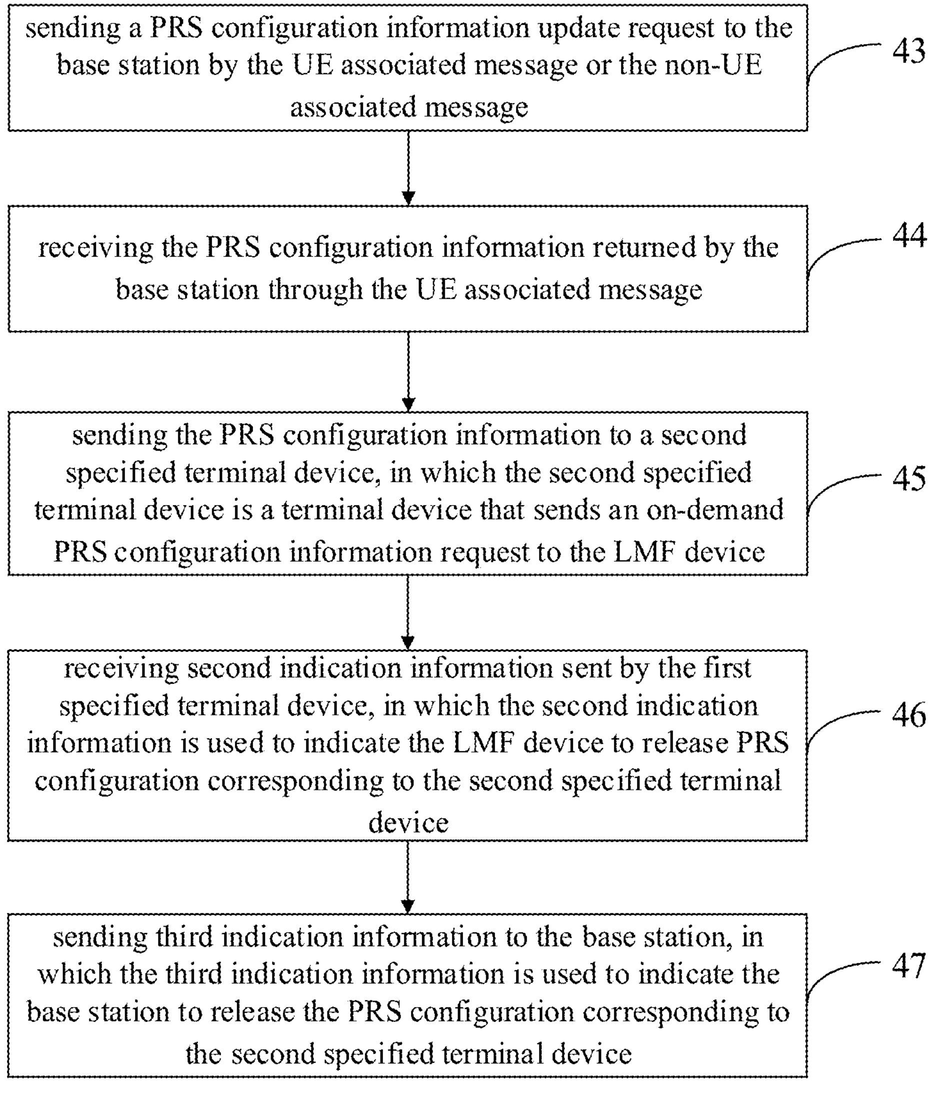
FIG. 4*a* is a schematic flowchart of a method for determining PRS configuration information provided by embodiments of the present disclosure.

For ease of understanding, terms involved in the present disclosure are introduced first.

1. On-Demand PRS

In order to better meet positioning requirements, such as improving a positioning precision and improving a network efficiency, it is considered to introduce the on-demand PRS in a communication system, that is, the PRS is requested on demand. For the on-demand PRS, there are the following ways:

a terminal device sending an on-demand PRS request to an LMF device;

an LMF device sending the on-demand PRS request to a next generation NodeB (gNB); and a terminal device sending the on-demand PRS request to a gNB.

2. New Radio Positioning Protocol a (NRPPa) Message

An NRPPa is a protocol configured to standardize a control plane wireless network layer signaling process between a base station and an LMF device. The NRPPa messages between the LMF device and the gNB may be classified into: a non-UE associated message and a UE associated message.

The non-UE associated message may be used to transmit TRP information, measurement information, auxiliary information or the like between the base station and the LMF device. The UE associated message may be used to transmit specified UE associated information between the base station and the LMF device, such as TRP configuration information of the terminal device. Currently, the LMF device uses the non-UE associated message to send a PRS configuration information request to the base station.

Embodiments of the present disclosure provide a method and apparatus for determining positioning reference signaling (PRS) configuration information, which may be applied to positioning services in a communication system. By requesting the PRS configuration information from a base station through a terminal device or an LMF device via a UE associated message or a non-UE associated message, it not only enriches the acquisition manner of the PRS configuration information, but also positions the terminal device.

In a first aspect, embodiments of the present disclosure provide a method for determining positioning reference signaling configuration information, which is configured to be performed by a location management function (LMF) device and includes: sending a PRS configuration information request to a base station via a non-UE associated message or a UE associated message.

In this technology, the LMF device requests PRS configuration information from the base station via the UE associated message or the non-UE associated message, which not only enriches the acquisition manner of the PRS configuration information, but also provides more reliable and accurate PRS configuration information for positioning the terminal devices, thereby improving the precision and reliability of the positioning result.

In an implementation, sending the PRS configuration information request to the base station via the non-UE associated message or the UE associated message includes:

requesting the PRS configuration information from the base station via a transmission reception point (TRP) information request message; or requesting the PRS configuration information from the base station via a specified positioning information request message; or requesting the PRS configuration information from the base station via a specified UE associated message.

In another implementation, sending the PRS configuration information request to the base station via the non-UE associated message or the UE associated message includes:

sending an on-demand PRS configuration information request to the base station via the non-UE associated message or the UE associated message; or in response to receiving an on-demand PRS configuration information request sent by a terminal device, sending a PRS configuration information update request to the base station via the UE associated message; or sending an initial PRS configuration information request to the base station via the non-UE associated message or the UE associated message.

In some embodiments, in response to receiving the on-demand PRS configuration information request sent by the terminal device, sending the PRS configuration information update request to the base station via the UE associated message includes: in response to a number of received on-demand PRS configuration information requests sent by terminal devices being less than or equal to a threshold value, sending the PRS configuration information request to the base station via the UE associated message.

In some embodiments, sending the PRS configuration information request to the base station via the non-UE associated message or the UE associated message includes: in response to a number of received on-demand PRS configuration information requests sent by terminal devices being greater than a threshold value, sending the PRS configuration information request to the base station via the non-UE associated message.

In a possible implementation, sending the PRS configuration information request to the base station by the non-UE associated message includes: determining common PRS configuration information according to a plurality of pieces of on-demand PRS configuration information; and sending a common PRS configuration information request to the base station via the non-UE associated message.

In another possible implementation, sending the PRS configuration information request to the base station via the non-UE associated message or the UE associated message includes:

in response to requested PRS configuration information being an aperiodic PRS or a semi-persistent PRS, sending the PRS configuration information request to the base station via the UE associated message; or in response to requested PRS configuration information being a periodic PRS, sending the PRS configuration information request to the base station via the non-UE associated message.

In some embodiments, the method further includes: in response to receiving the PRS configuration information returned by the base station through the non-UE associated message, sending first indication information to the base station. The first indication information is used to indicate the base station to send the PRS configuration information to the terminal device via a system information block (SIB).

In some embodiments, the method further includes: receiving the PRS configuration information returned by the base station through the non-UE associated message; and sending the PRS configuration information to a first specified terminal device by a long term evolution positioning protocol (LPP) message. The first specified terminal device is a terminal device that sends an on-demand PRS configuration information request to the LMF device, and/or a terminal device that has been configured with PRS configuration information corresponding to the base station.

In some embodiments, the method further includes: receiving the PRS configuration information returned by the base station through the UE associated message; and sending the PRS configuration information to a second specified terminal device. The second specified terminal device is a terminal device that sends an on-demand PRS configuration information request to the LMF device.

In some embodiments, the method further includes: receiving second indication information sent by the second specified terminal device. The second indication information is used to indicate the LMF device to release PRS configuration corresponding to the second specified terminal device.

In some embodiments, the method further includes: sending third indication information to the base station. The third indication information is used to indicate the base station to release the PRS configuration corresponding to the second specified terminal device.

In a second aspect, embodiments of the present disclosure provide a method for determining positioning reference signaling configuration information, which is configured to be performed by a terminal device and includes:

- sending an on-demand PRS configuration information request to a network device, in which the network device is an LMF device or a base station; and
- receiving PRS configuration information returned by the network device.

In a possible implementation, the network device is the LMF, and receiving the PRS configuration information returned by the network device includes: receiving the PRS configuration information returned by the LMF device through a long term evolution positioning protocol (LPP) message.

In a possible implementation, the method further includes: in response to an end of a positioning process, sending second indication information to the LMF device. The second indication information is used to indicate the LMF device to release PRS configuration corresponding to the terminal device.

In some embodiments, the method further includes: in response to an end of a positioning process, sending fourth indication information to the base station. The fourth indication information is used to indicate the base station to release PRS configuration corresponding to the terminal device.

In some embodiments, the network device is the base station, and receiving the PRS configuration information returned by the network device includes: receiving the PRS configuration information returned by the base station through a SIB.

In a third aspect, embodiments of the present disclosure provide a method for determining positioning reference signaling configuration information, which is configured to be performed by a base station and includes: receiving a PRS configuration information request sent by a communication device; and returning PRS configuration information to the communication device. The communication device is an LMF device or a terminal device, and the PRS configuration information request sent by the LMF device is a non-UE associated message or a UE associated message.

In some embodiments, the method further includes:

- in response to the PRS configuration information request being the UE associated message, determining the PRS configuration information being UE specific PRS configuration information; or
- in response to the PRS configuration information request being the non-UE associated message, determining the PRS configuration information being cell specific PRS configuration information.

In some embodiments, returning the PRS configuration information to the communication device includes:

- in response to the PRS configuration information request being the UE associated message, returning UE specific PRS configuration information to the communication device via the UE associated message; or
- in response to the PRS configuration information request being the non-UE associated message, returning cell specific PRS configuration information to the communication device via the non-UE associated message.

In some embodiments, the method further includes:

- receiving first indication information sent by the LMF device, in which the first indication information is used to indicate the PRS configuration information to be sent to the terminal device via a system information block (SIB); and
- sending the SIB containing the PRS configuration information.

In some embodiments, the method further includes: in response to receiving third indication information sent by the LMF device, or receiving fourth indication information sent by the terminal device, releasing the PRS configuration. The third indication information or the fourth indication information is used to indicate the base station to release the PRS configuration.

In a fourth aspect, embodiments of the present disclosure provide a communication apparatus, which has part or all of functions for implementing the LMF device in the method according to the first aspect above. For example, the apparatus may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In a fifth aspect, embodiments of the present disclosure provide a communication apparatus, which has part or all of functions for implementing the terminal device in the method according to the second aspect above. For example, the apparatus may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In a sixth aspect, embodiments of the present disclosure provide a communication apparatus, which has part or all of functions for implementing the base station in the method according to the third aspect above. For example, the apparatus may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation, a structure of each above apparatus may include a transceiving module and a processing module, and the processing module is configured to support the apparatus to perform corresponding functions in the above method. The transceiving module is configured to support a communication between the apparatus and other devices. The apparatus may further include a storage module, which is configured to be coupled with the transceiving module and the processing module, and store necessary computer programs and data of the communication apparatus.

As an example, the processing module may be a processor, the transceiving module may be a transceiver or a communication interface, and the storage module may be a memory.

In a seventh aspect, embodiments of the present disclosure provide a communication device, which includes a processor that, when invokes a computer program in a memory, executes the method according to the first aspect above.

In an eighth aspect, embodiments of the present disclosure provide a communication device, which includes a processor that, when invokes a computer program in a memory, executes the method according to the second aspect above.

In a ninth aspect, embodiments of the present disclosure provide a communication device, which includes a processor that, when invokes a computer program in a memory, executes the method according to the third aspect above.

In a tenth aspect, embodiments of the present disclosure provide a communication device, which includes a processor and a memory having stored therein a computer program. The processor is configured to execute the computer program stored in the memory, to cause the communication device to implement the method according to the first aspect above.

In an eleventh aspect, embodiments of the present disclosure provide a communication device, which includes a processor and a memory having stored therein a computer program. The processor is configured to execute the computer program stored in the memory, to cause the communication device to implement the method according to the second aspect above.

In a twelfth aspect, embodiments of the present disclosure provide a communication device, which includes a processor and a memory having stored therein a computer program. The processor is configured to execute the computer program stored in the memory, to cause the communication device to implement the method according to the third aspect above.

In a thirteenth aspect, embodiments of the present disclosure provide a computer-readable storage medium, for storing instructions used by the above-mentioned terminal device. The instructions, when executed, cause the terminal device to implement the method according to the first aspect above.

In a fourteenth aspect, embodiments of the present disclosure provide a readable storage medium, for storing instructions used by the above-mentioned network device. The instructions, when executed, cause the network device to implement the method according to the second aspect above.

In a fifteenth aspect, embodiments of the present disclosure provide a readable storage medium, for storing instructions used by the above-mentioned base station. The instructions, when executed, cause the base station to implement the method according to the third aspect above.

In a sixteenth aspect, the present disclosure further provides a computer program product, which includes a computer program that, when run on a computer, causes the computer to implement the method according to the first aspect above.

In a seventeenth aspect, the present disclosure further provides a computer program product, which includes a computer program that, when run on a computer, causes the computer to implement the method according to the second aspect above.

In an eighteenth aspect, the present disclosure further provides a computer program product, which includes a computer program that, when run on a computer, causes the computer to implement the method according to the third aspect above.

In a nineteenth aspect, the present disclosure provides a chip system, which includes at least one processor and an interface, for supporting a terminal device to implement functions involved in the first aspect, for example, determining or processing at least one of data and information involved in the above method. In a possible design, the chip system further includes a memory for storing necessary computer programs and data of the terminal device. The chip system may consist of chips, or may include chips and other discrete devices.

In a twentieth aspect, the present disclosure provides a chip system, which includes at least one processor and an interface, for supporting a network device to implement functions involved in the second aspect, for example, determining or processing at least one of data and information involved in the above method. In a possible design, the chip system further includes a memory for storing necessary computer programs and data of the network device. The chip system may consist of chips, or may include chips and other discrete devices.

In a twenty-first aspect, the present disclosure provides a chip system, which includes at least one processor and an interface, for supporting a base station to implement functions involved in the third aspect, for example, determining or processing at least one of data and information involved in the above method. In a possible design, the chip system further includes a memory for storing necessary computer programs and data of the base station. The chip system may consist of chips, or may include chips and other discrete devices.

In a twenty-second aspect, the present disclosure provides a computer program that, when run on a computer, causes the computer to implement the method according to the first aspect above.

In a twenty-third aspect, the present disclosure provides a computer program that, when run on a computer, causes the computer to implement the method according to the second aspect above.

In a twenty-fourth aspect, the present disclosure provides a computer program that, when run on a computer, causes the computer to implement the method according to the third aspect above.

In order to better understand a method for determining positioning reference signaling configuration information described in embodiments of the present disclosure, a communication system to which embodiments of the present disclosure are applicable is firstly described below.

FIG. 1 is a schematic architecture diagram of a communication system provided by embodiments of the present disclosure. Referring to FIG. 1, the communication system may include, but is not limited to, a base station, an LMF device, and a terminal device. The number and forms of the devices shown in FIG. 1 are only as an example and do not constitute a limitation on embodiments of the present disclosure. The communication system may include two or more base stations, two or more terminal devices, and two or more LMF devices in practical applications. As an example for illustration, the communication system shown in FIG. 1 includes an LMF device 11, a terminal device 12 and a base station 13.

It should be noted that the technical solutions of embodiments of the present disclosure may be applied to various communication systems, for example, a long term evolution (LTE) system, a 5th generation (5G) mobile communication system, a 5G new radio (NR) system, or other future new mobile communication systems. The base station 13 in embodiments of the present disclosure is an entity on a network side for sending or receiving signals. For example, the base station 13 may be an evolved NodeB (eNB), a next generation NodeB (gNB) in a NR system, a base station in other future mobile communication systems, or an access node in a wireless fidelity (WiFi) system. Embodiments of the present disclosure do not limit the specific technology and specific device form adopted by the network device.

The LMF device 11 and the base station 13 provided by embodiments of the present disclosure may be composed of a central unit (CU) and distributed units (DU). The CU may also be called a control unit. Using the CU-DU structure allows to split a protocol layer of the network device, such as the base station, a part of functions of the protocol layer is centrally controlled in the CU, some or all of the remaining functions of the protocol layer are distributed in the DUs, and the CU centrally controls the DUs.

The terminal device 12 in embodiments of the present disclosure is an entity on a user side for receiving or sending signals, such as a mobile phone. The terminal device may also be called a terminal, a user equipment (UE), a mobile station (MS), a mobile terminal (MT), and so on. The terminal device may be a device with a communication function, such as a car, a smart car, a mobile phone, a wearable device, a tablet Pad, a computer with a wireless transceiving function, a virtual reality (VR) terminal device, an augmented reality (AR) terminal device, a wireless terminal device in an industrial control, a wireless terminal device in a self-driving, a wireless terminal device in a remote medical surgery, a wireless terminal device in a smart grid, a wireless terminal device in a transportation safety, a wireless terminal device in a smart city, a wireless terminal device in a smart home, etc. Embodiments of the present disclosure do not limit the specific technology and the specific device form adopted by the terminal device.

It can be understood that the communication system described in embodiments of the present disclosure is intended to illustrate the technical solutions of embodiments of the present disclosure more clearly, and does not constitute a limitation on the technical solutions provided by embodiments of the present disclosure. Those of ordinary skill in the art will know that with an evolution of a system architecture and an emergence of a new service scenario, the technical solutions provided by embodiments of the present disclosure are also applicable to similar technical problems.

A method and apparatus for determining PRS configuration information provided by the present disclosure will be described in detail below with reference to the accompanying drawings.

Please refer to FIG. 2, which is a schematic flowchart of a method for determining PRS configuration information provided by embodiments of the present disclosure. The method is configured to be performed by an LMF device. As shown in FIG. 2, the method may include, but is not limited to, a following step.

In step 21, a PRS configuration information request is sent to a base station via a non-UE associated message or a UE associated message.

In the present disclosure, in order to improve a precision and efficiency of positioning, the LMF device may use a variety of messages to request PRS configuration information from the base station.

In some embodiments, the LMF device may request the PRS configuration information from the base station via the non-UE associated message, such as a TRP information request message. It can be understood that when requesting the PRS configuration information from the base station via the TRP information request message, the base station may provide cell specific PRS configuration information for the LMF device or a terminal device.

In some embodiments, the LMF device may also request the PRS configuration information from the base station via a specified positioning information request message.

The specified positioning information request message may be implemented by the LMF device by extending a length of a positioning information request message, for example, adding a bit in the positioning information request message for indicating whether to request the PRS configuration information, and configuring different values for the bit to indicate the base station whether the message also requests the PRS configuration information.

In some embodiments, the LMF device may also request the PRS configuration information from the base station via a specified UE associated message.

The specified UE associated message may be generated by the LMF device according to a protocol or a network configuration. It can be understood that any format and type of messages that can indicate to the base station that the message type is UE associated and is used to request UE specific PRS configuration information may be used as the specified UE associated message in the present disclosure.

It can be understood that in the present disclosure, the LMF device sends the PRS configuration information request to the base station via the non-UE associated message or the UE associated message, so that a plurality of types of PRS configuration information can be obtained. For example, the UE specific PRS configuration information may be obtained, and base station specific or TRP specific PRS configuration information may also be obtained, which not only enriches the diversity of ways to obtain the PRS configuration information, but also provides a more reliable and more accurate PRS configuration information for positioning of the terminal device, thereby improving the precision and reliability of the positioning result.

It should be noted that the UE specific PRS configuration information in the present disclosure refers to PRS configuration information used for positioning of the specified terminal device. The base station specific, TRP specific or cell specific PRS configuration information refers to PRS configuration information that can be used by all terminal devices that require the PRS of the base station, TRP or cell for positioning.

Correspondingly, the UE specific PRS configuration information may be transmitted through the UE associated message, while the base station specific, TRP specific or cell specific PRS configuration information may be transmitted through the non-UE associated message.

In some embodiments, the LMF device in the present disclosure may determine timing of sending a PRS configuration information request to the base station as needed.

For example, in order to better meet positioning requirements, such as improving a positioning precision, the LMF device needs to update the PRS configuration information, so the LMF device may send an on-demand PRS configuration information request to the base station via the non-UE associated message or the UE associated message.

Alternatively, in order to better meet the positioning requirements, the terminal device may send an on-demand PRS configuration information request to the LMF device. Then, the LMF device may, after receiving the on-demand PRS configuration information request sent by the terminal device, send a PRS configuration information update request to the base station via the UE associated message.

Alternatively, in order to implement a positioning function, when the LMF device is to obtain the PRS configuration information of the base station for the first time, it may send an initial PRS configuration information request to the base station via the non-UE associated message to obtain initial PRS configuration information for positioning.

In some embodiments, in order to better meet the positioning requirements, such as more flexible and accurate positioning, the LMF device may also request different types of PRS configuration information from the base station via different messages.

For example, since an aperiodic PRS or a semi-persistent PRS lasts for a shorter time and is more conducive to meet the positioning requirements of the terminal device, in a case where requested PRS configuration information is the aperiodic PRS or the semi-persistent PRS, the LMF device may send the PRS configuration information request to the base station via the UE associated message.

Alternatively, in a case where the requested PRS configuration information is a periodic PRS, the PRS configuration information request may be sent to the base station via the non-UE associated message. Therefore, the cell specific PRS configuration information may be updated periodically to ensure the positioning precision and reliability of each terminal device.

By implementing embodiments of the present disclosure, the LMF device may send the PRS configuration information request to the base station via the non-UE associated message or the UE associated message to obtain a plurality of types of PRS configuration information, which not only enriches forms of requesting the PRS configuration information, but also provides more reliable and accurate PRS configuration information for positioning the terminal device, thereby improving the precision and reliability of the positioning result.

Please refer to FIG. 3, which is a schematic flowchart of another method for determining positioning reference signaling configuration information provided by embodiments of the present disclosure. The method is configured to be performed by an LMF device. As shown in FIG. 3, the method may include, but is not limited to, the following steps.

In step 31, in response to a number of received on-demand PRS configuration information requests sent by terminal devices being less than or equal to a threshold value, a PRS configuration information request is sent to a base station via the UE associated message.

In the present disclosure, in order to better meet positioning requirements, the terminal device may send an on-demand PRS configuration information request to the LMF device, and the LMF device, when receives the on-demand PRS configuration information request sent by the terminal device, may send the PRS configuration information request to the base station via the UE associated message to request the PRS configuration information of the terminal device.

In the present disclosure, if the number of on-demand PRS configuration information requests received by the LMF device from terminal devices is N and less than the threshold value, when sending the PRS configuration information requests to the base station, the LMF device may send N PRS configuration information requests to the base station to request respective PRS configuration information for the N terminal devices, respectively. Alternatively, the LMF device may use a piece of UE associated message to request the respective PRS configuration information corresponding to the N terminal devices, respectively. For example, the positioning information request message may be extended, so that it can request a plurality of pieces of PRS configuration information at one time, or a new UE associated message may be defined to request a plurality of pieces of PRS configuration information at one time. The present disclosure is not limited thereto.

Since the number of on-demand PRS configuration information requests received by the LMF device from terminal devices at the same time may be different, if the base station bases on the UE associated message to request the PRS configuration information for each terminal device, the base station may not have enough resources to configure specific PRS configuration information for each terminal device requesting the PRS configuration information. Therefore, in the present disclosure, a threshold value may be configured according to the protocol or the network, so that only when the number of received on-demand PRS configuration information requests is less than or equal to the threshold value, the LMF device sends the PRS configuration information requests to the base station through the UE associated message.

The present disclosure does not limit a size of the threshold value.

In some embodiments, if the number of on-demand PRS configuration information requests received by the LMF device from terminal devices is greater than the threshold value, the LMF device may send the PRS configuration information requests to the base station via the non-UE associated message. That is, when the LMF device receives the PRS configuration information requests from a plurality of terminal devices at the same time, it means that all the plurality of terminal devices have a more accurate positioning requirement, so the LMF device may directly send the non-UE associated message to the base station to request the PRS configuration information. As a result, base station specific or TRP specific PRS configuration information may be obtained for use by the plurality of terminal devices, so that terminal devices with positioning needs may implement accurate positioning. In this way, the amount of resources used by the LMF device when requesting the PRS configuration information is reduced, and the efficiency of obtaining the PRS configuration information is improved. In addition, when the number of on-demand PRS configuration information requests received by the LMF device from the terminal devices is greater than the threshold value, the base station may not have enough resources to configure a specific PRS configuration information for each terminal device requesting the PRS configuration information. Therefore, the LMF device may send the PRS configuration information request to the base station via the non-UE associated message, so as to obtain the base station specific or TRP specific PRS configuration information for use by the plurality of terminal devices.

In some embodiments, since different terminal devices are located in different cells, in order to further make the PRS configuration information requested by the LMF more targeted and accurate, in the present disclosure, in a case where the number of on-demand PRS configuration information requests received by the LMF device is greater than the threshold value, common PRS configuration information may be determined first according to the received plurality of on-demand PRS configuration information, and then a common PRS configuration information request is sent to the base station via the non-UE associated message.

The LMF device may determine the common PRS configuration information corresponding to the plurality of on-demand PRS configuration information according to auxiliary information in the PRS configuration information requests of the plurality of terminal devices, such as locations of the terminal devices, or other information, which is not limited in the present disclosure.

In step 32, the PRS configuration information returned by the base station through the UE associated message is received.

In some embodiments, the PRS configuration information returned by the base station through the UE associated message may include identifier of the terminal device or any other identifier that can assist the LMF device in determining a terminal device corresponding to the PRS configuration information, such as a PRS configuration information identifier, etc. The present disclosure is not limited thereto.

In step 33, the PRS configuration information is sent to a second specified terminal device. The second specified terminal device is a terminal device that sends an on-demand PRS configuration information request to the LMF device.

There may be one or more second specified terminal devices, which is not limited in the present disclosure.

In some embodiments, the LMF device may send the PRS configuration information to the second specified terminal device by a long term evolution positioning protocol (LPP) message.

In some embodiments, after receiving the PRS configuration information request sent by the LMF device through the UE associated message, if the base station cannot determine the PRS configuration information of the second specified terminal device, or the determined PRS configuration information of the second specified terminal device is the same as the PRS configuration information of the base station or the TRP, the base station may return the PRS configuration information to the LMF device via the non-UE associated message. Therefore, the LMF device may send the received PRS configuration information to the second specified terminal device and other terminal devices, which is not limited in the present disclosure.

By implementing embodiments of the present disclosure, when the number of received on-demand PRS configuration information requests sent by terminal devices is less than or equal to the threshold value, the LMF device sends a PRS configuration information request to the base station via the UE associated message, and after receiving the PRS configuration information returned by the base station through the UE associated message, the LMF device sends the information to the second specified terminal device. In this way, without adding too many network resources, forms of requesting the PRS configuration information are enriched, and more reliable and accurate PRS configuration information is provided for positioning the terminal device, thereby improving the precision and reliability of the positioning result.

Please refer to FIG. 4, which is a schematic flowchart of another method for determining positioning reference signaling configuration information provided by embodiments of the present disclosure. The method is configured to be performed by an LMF device. As shown in FIG. 4, the method may include, but is not limited to, the following steps.

In step 41, a PRS configuration information request is sent to a base station via a non-UE associated message or a UE associated message.

In embodiments of the present disclosure, the LMF device determines a way and a reference basis for sending the PRS configuration information request to the base station, and reference can be made to the detailed description of any embodiment of the present disclosure, which will not be repeated here.

In step 42, in response to receiving PRS configuration information returned by the base station through the non-UE associated message, first indication information is sent to the base station. The first indication information is used to indicate the base station to send the PRS configuration information to the terminal device via a system information block (SIB).

Usually, after the LMF device sends the PRS configuration information request to the base station, the base station may return the PRS configuration information to the LMF device, and then the LMF device sends the PRS configuration information to the terminal device.

In the present disclosure, if the PRS configuration information requested by the LMF device from the base station is configuration information of the base station or TRP, that is, it is cell specific PRS configuration information that can be used by a plurality of terminal devices during a positioning process, in order to enable each terminal device to quickly obtain the PRS configuration information, in the present disclosure, the LMF device may indicate the base station to directly send the PRS configuration information to the terminal device.

In some embodiments, the LMF device may indicate the base station to send the PRS configuration information to the terminal device by a positioning SIB, and the present disclosure is not limited thereto.

In some embodiments, after sending the PRS configuration information request to the base station, if the LMF device receives the PRS configuration information returned by the base station through the non-UE associated message, the LMF device may send the PRS configuration information to a first specified terminal device via an LPP message. The first specified terminal device is a terminal device that sends an on-demand PRS configuration information request to the LMF device, and/or a terminal device that has been configured with PRS configuration information of the base station.

There may be one or more first specified terminal devices, which is not limited in the present disclosure.

It can be understood that in the present disclosure, no matter what message the LMF device is based to send the PRS configuration information request to the base station, as long as the PRS configuration information received by the LMF device from the base station is via the non-UE associated message, the LMF device may send the received PRS configuration information to the terminal device that has a positioning need and/or the terminal device that has previously configured with the PRS configuration information of the base station. Further, as long as the PRS configuration information received by the LMF device from the base station is via the UE associated message, the LMF device can only send the received PRS configuration information to one or several specified terminal devices corresponding to the UE associated message.

By implementing embodiments of the present disclosure, the LMF device first sends the PRS configuration information request to the base station via the non-UE associated message or the UE associated message, and then if the LMF device receives the PRS configuration information returned by the base station through the non-UE associated message, the LMF device sends to the base station the first indication information for indicating the base station to send the PRS configuration information to the terminal device via the system information block (SIB). In this way, the forms of requesting the PRS configuration information are enriched, the efficiency of the terminal device to obtain the PRS configuration information is improved, more reliable and accurate PRS configuration information is provided for positioning the terminal device, and the precision and reliability of the positioning result is improved.

Please refer to FIG. 4*a*, which is a schematic flowchart of another method for determining PRS configuration information provided by embodiments of the present disclosure. The method is configured to be performed by an LMF device. As shown in FIG. 4*a*, the method may include, but is not limited to, the following steps.

In step 43, a PRS configuration information update request is sent to the base station via the UE associated message or the non-UE associated message.

In step 44, PRS configuration information returned by the base station through the UE associated message is received.

In step 45, the PRS configuration information is sent to a second specified terminal device. The second specified terminal device is a terminal device that sends an on-demand PRS configuration information request to the LMF device.

The number and type of the second specified terminal devices are not limited in the present disclosure. In addition, for specific implementations of each of the above steps, reference can be made to the detailed description of any embodiment of the present disclosure, which will not be repeated here.

In step 46, second indication information sent by the second specified terminal device is received. The second indication information is used to indicate the LMF device to release PRS configuration corresponding to the second specified terminal device.

In step 47, third indication information is sent to the base station. The third indication information is used to indicate the base station to release the PRS configuration corresponding to the second specified terminal device.

In the present disclosure, in order to reduce device resources occupied via the PRS configuration information, after the positioning is completed, the terminal device may send the second indication information to the LMF device to indicate the release of the PRS configuration corresponding to the terminal device. Therefore, the LMF device may send the third indication information to the base station to indicate the base station to release the PRS configuration corresponding to the first specified terminal device.

In some embodiments, the LMF device in the present disclosure may directly send the third indication information to the base station to indicate the base station to release the PRS configuration corresponding to the second specified terminal device. That is, whether the LMF device sends the third indication information does not depend on whether the second indication information sent by the terminal device is received. For example, after determining that the positioning of the terminal device is completed, the LMF device may send the third indication information to the base station to indicate the base station to release the PRS configuration corresponding to the second specified terminal device.

In some embodiments, the indication information for indicating the base station to release the PRS configuration corresponding to the second specified terminal device may also be sent to the base station by the second specified terminal device, which is not limited in the present disclosure.

By implementing embodiments of the present disclosure, after the LMF device requests the PRS configuration information from the base station via the UE associated message or the non-UE associated message, if the LMF device receives the PRS configuration information via the UE associated message, the LMF device sends the configuration information to the second specified terminal device, and may indicate the base station to release the PRS configuration corresponding to the second specified terminal device after receiving the second indication information sent by the second specified terminal device. In this way, it not only enriches forms of requesting the PRS configuration information, but also provides more reliable and accurate PRS configuration information for positioning the terminal device, improves the precision and reliability of the positioning result, and avoids the PRS configuration information to occupy the device resources for a too long time.

Figures 5, 6:
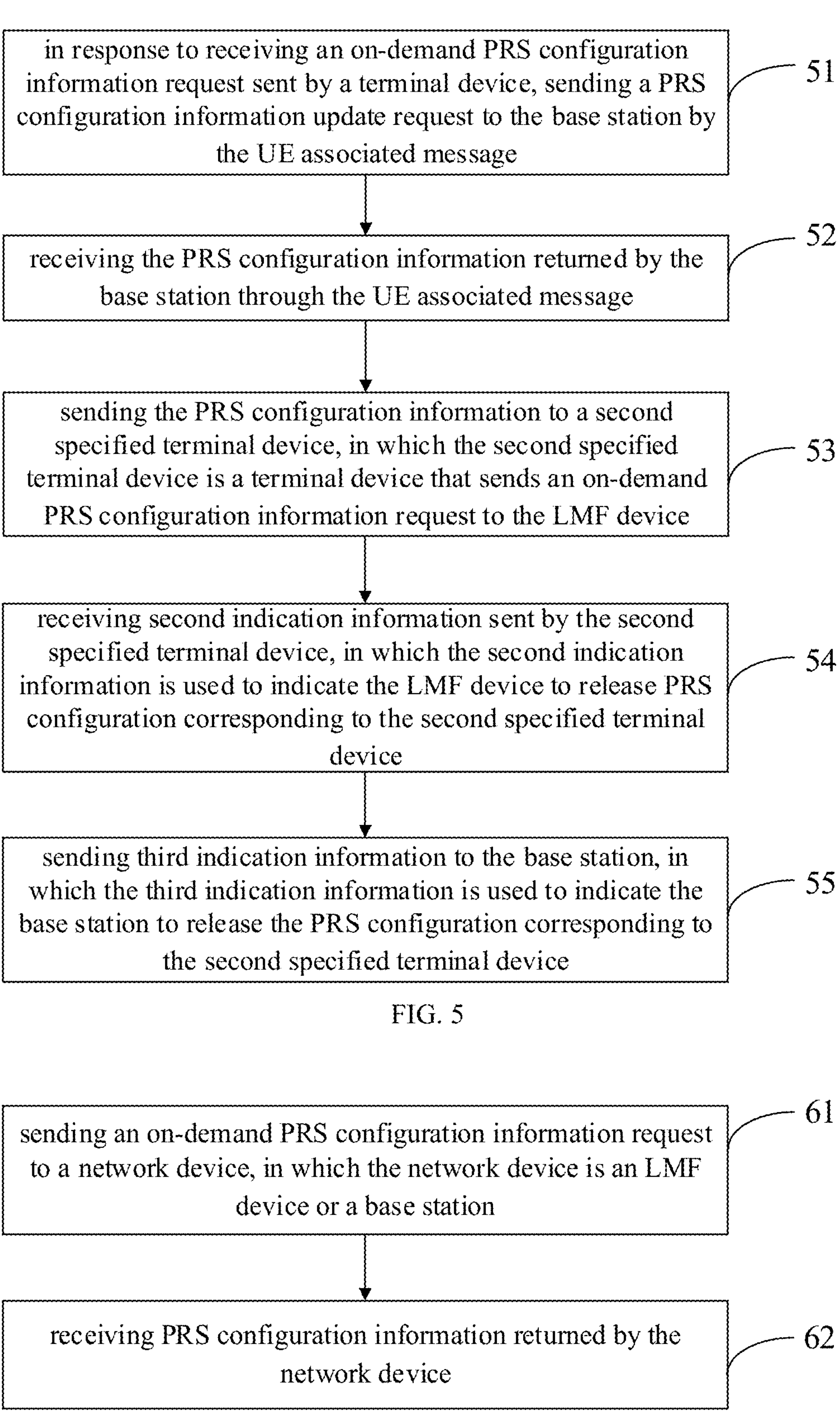
FIG. 5 is a schematic flowchart of a method for determining PRS configuration information provided by embodiments of the present disclosure.
FIG. 6 is a schematic flowchart of a method for determining PRS configuration information provided by embodiments of the present disclosure.

Please refer to FIG. 5, which is a schematic flowchart of another method for determining PRS configuration information provided by embodiments of the present disclosure. The method is configured to be performed by an LMF device. As shown in FIG. 5, the method may include, but is not limited to, the following steps.

In step 51, in response to receiving an on-demand PRS configuration information request sent by a terminal device, a PRS configuration information update request is sent to a base station via a UE associated message.

In step 52, PRS configuration information returned by the base station through the UE associated message is received.

In step 53, the PRS configuration information is sent to a second specified terminal device. The second specified terminal device is a terminal device that sends an on-demand PRS configuration information request to the LMF device.

The number and type of the second specified terminal devices are not limited in the present disclosure. In addition, for specific implementations of each of the above steps, reference can be made to the detailed description of any embodiment of the present disclosure, which will not be repeated here.

In step 54, second indication information sent by the second specified terminal device is received. The second indication information is used to indicate the LMF device to release PRS configuration corresponding to the second specified terminal device.

In step 55, third indication information is sent to the base station. The third indication information is used to indicate the base station to release the PRS configuration corresponding to the second specified terminal device.

In the present disclosure, in order to reduce device resources occupied by the PRS configuration information, after the positioning is completed, the terminal device may send the second indication information to the LMF device to indicate the release of the PRS configuration corresponding to the terminal device. Therefore, the LMF device may send the third indication information to the base station to indicate the base station to release the PRS configuration corresponding to the second specified terminal device.

In some embodiments, the LMF device in the present disclosure may directly send the third indication information to the base station to indicate the base station to release the PRS configuration corresponding to the second specified terminal device. That is, whether the LMF device sends the third indication information does not depend on whether the second indication information sent by the terminal device is received. For example, after determining that the positioning of the terminal device is completed, the LMF device may send the third indication information to the base station to indicate the base station to release the PRS configuration corresponding to the second specified terminal device.

In some embodiments, the indication information for indicating the base station to release the PRS configuration corresponding to the second specified terminal device may also be sent to the base station by the second specified terminal device, which is not limited in the present disclosure.

By implementing embodiments of the present disclosure, when the LMF device receives the on-demand PRS configuration information request sent by the terminal device, the LMF device may request the PRS configuration information from the base station via the UE associated message, and after receiving the PRS configuration information via the UE associated message, the LMF device sends the configuration information to the second specified terminal device, and may indicate the base station to release the PRS configuration corresponding to the second specified terminal device after receiving the second indication information sent by the second specified terminal device. In this way, it not only enriches forms of requesting the PRS configuration information, but also provides more reliable and accurate PRS configuration information for positioning the terminal device, improves the precision and reliability of the positioning result, and avoids the PRS configuration information to occupy device resources for a too long time.

Please refer to FIG. 6, which is a schematic flowchart of another method for determining PRS configuration information provided by embodiments of the present disclosure. The method is configured to be performed by a terminal device. As shown in FIG. 6, the method may include, but is not limited to, the following steps.

In step 61, an on-demand PRS configuration information request is sent to a network device. The network device is an LMF device or a base station.

In step 62, PRS configuration information returned by the network device is received.

In the present disclosure, in order to better meet positioning requirements of the terminal device, the terminal device may request the PRS configuration information from the LMF device or the base station as needed to obtain latest PRS configuration information from the LMF device or the base station, and then perform positioning using the obtained PRS configuration information.

In some embodiments, if the network device is an LMF device, the terminal device may receive the PRS configuration information via an LPP message.

It can be understood that if the network device is the LMF device, the LMF device also needs to send a PRS configuration information request to the base station to request the PRS configuration information from the base station side, and then send the PRS configuration information returned by the base station to the terminal device.

In some embodiments, if the network device is a base station, the terminal device may receive the PRS configuration information returned by the base station through a SIB. For example, the PRS configuration information returned by the base station may be received by a positioning SIB.

The specific implementations of the terminal device sending the on-demand PRS configuration information request to the network device, and the terminal device receiving the PRS configuration information returned by the network device may refer to the detailed description of any embodiment of the present disclosure, which will not be repeated here.

By implementing embodiments of the present disclosure, the terminal device may send the on-demand PRS configuration information request to the LMF device or the base station to obtain the PRS configuration information returned by the LMF device or the base station. In this way, it enriches forms in which the terminal device requests the PRS configuration information, provides more reliable and accurate PRS configuration information for positioning the terminal device, and improves the precision and reliability of the positioning result.

Figures 7, 8:
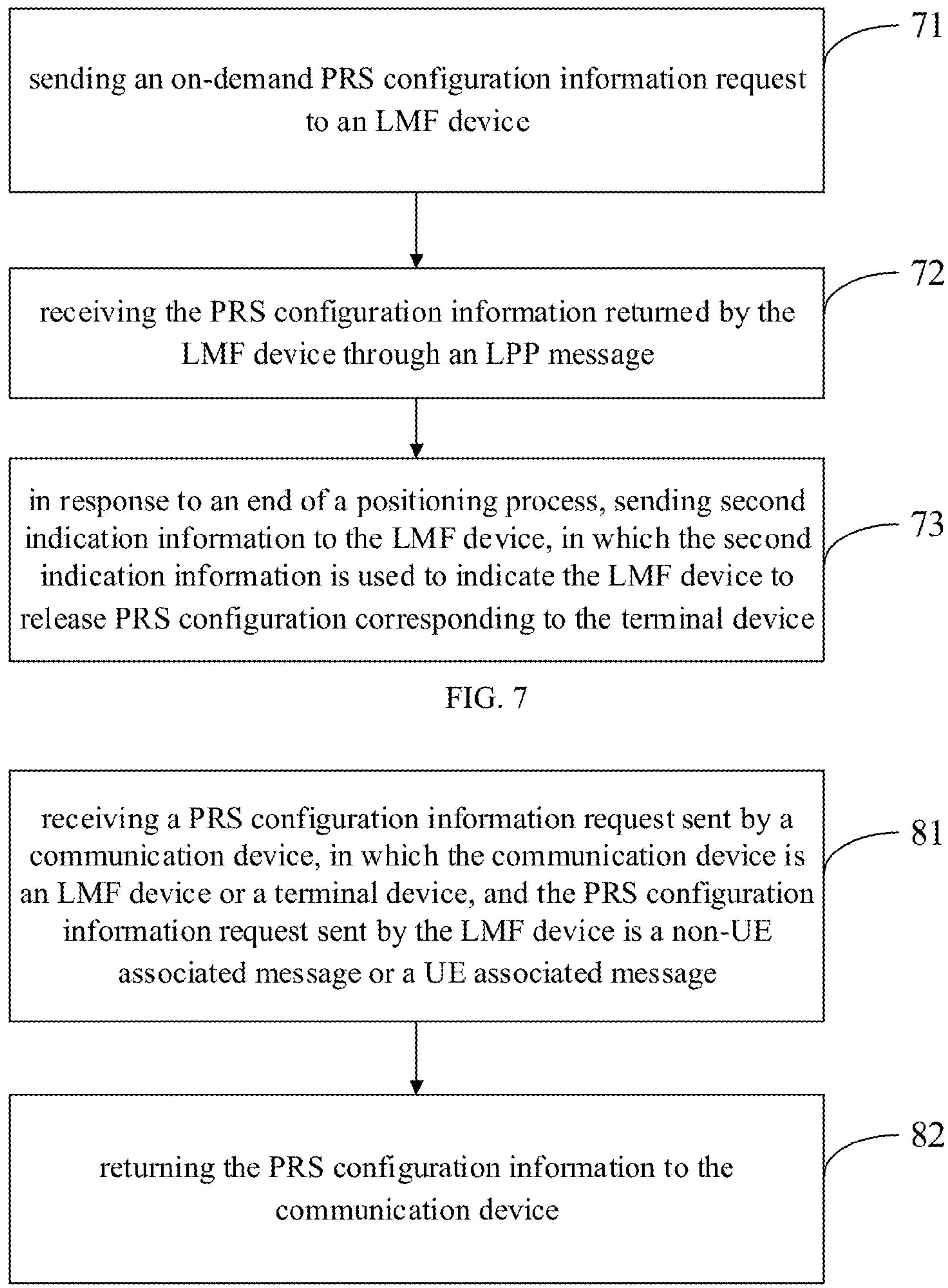
FIG. 7 is a schematic flowchart of a method for determining PRS configuration information provided by embodiments of the present disclosure.
FIG. 8 is a schematic flowchart of a method for determining PRS configuration information provided by embodiments of the present disclosure.

Please refer to FIG. 7, which is a schematic flowchart of another method for determining PRS configuration information provided by embodiments of the present disclosure. The method is configured to be performed by a terminal device. As shown in FIG. 7, the method may include, but is not limited to, the following steps.

In step 71, an on-demand PRS configuration information request is sent to an LMF device.

In step 72, the PRS configuration information returned by the LMF device through an LPP message is received.

In step 73, in response to an end of a positioning process, second indication information is sent to the LMF device. The second indication information is used to indicate the LMF device to release PRS configuration corresponding to the terminal device.

In some embodiments, if the terminal device sends the on-demand PRS configuration information request to a base station, after ending the positioning process, the terminal device may also send fourth indication information to the base station. The fourth indication information is used to indicate the base station to release the PRS configuration corresponding to the terminal device.

In the present disclosure, in order to reduce device resources occupied by the PRS configuration information, after the positioning is completed, the terminal device may send the second indication information to the LMF device to indicate the LMF device to release the PRS configuration corresponding to the terminal device. Correspondingly, the terminal device may also send the fourth indication information to the base station to indicate the base station to release the PRS configuration corresponding to the terminal device.

It should be noted that if the terminal device requests the PRS configuration information from the LMF device, after the terminal device sends the second indication information to the LMF device, the LMF device sends the third indication information to the base station to indicate the base station to release the PRS configuration corresponding to the terminal device.

By implementing embodiments of the present disclosure, the terminal device first sends the on-demand PRS configuration information request to the LMF device, and then when receiving the PRS configuration information returned by the LMF device, the terminal device can perform positioning using the PRS configuration information, and after ending the positioning, the terminal device sends the second indication information to the LMF device to indicate the LMF device to release the PRS configuration corresponding to the terminal device. In this way, it not only enriches forms of requesting the PRS configuration information, but also provides more reliable and accurate PRS configuration information for positioning the terminal device, improves the precision and reliability of the positioning result, and avoids the PRS configuration information to occupy device resources for a too long time.

Please refer to FIG. 8, which is a schematic flowchart of another method for determining PRS configuration information provided by embodiments of the present disclosure. The method is configured to be performed by a base station. As shown in FIG. 8, the method may include, but is not limited to, the following steps.

In step 81, a PRS configuration information request sent by a communication device is received. The communication device is an LMF device or a terminal device, and the PRS configuration information request sent by the LMF device is a non-UE associated message or a UE associated message.

In step 82, the PRS configuration information is returned to the communication device.

In the present disclosure, in order to better meet positioning requirements, the terminal device and the LMF device may request the PRS configuration information from the base station at any time. According to the type of the requested PRS configuration information, the LMF device may also send the PRS configuration information request to the base station via different messages, for example, via a non-UE associated message or a UE associated message.

For specific usage scenarios of the non-UE associated message and the UE associated message, please refer to the detailed description of other embodiments of the present disclosure, which will not be repeated here.

It should be noted that if the PRS configuration information request received by the base station is sent by the terminal device, it means that the PRS configuration information request is a UE associated message.

In some embodiments, if the PRS configuration request received by the base station is a UE associated message, it may be determined that the PRS configuration information to be sent is information to be used by a specified terminal device during a positioning process, that is, the PRS configuration information is UE specific PRS configuration information. Therefore, the base station may determine PRS configuration information corresponding to the specified terminal device, and send the determined PRS configuration information to the LMF device or the terminal device via the UE associated message.

Alternatively, if the PRS configuration request received by the base station is a non-UE associated message, it may be determined that the PRS configuration information to be sent is information to be used by all the terminal devices under a certain base station or TRP during a positioning process, that is, the PRS configuration information is cell specific PRS configuration information. Therefore, the base station determines cell specific PRS configuration information, and sends the determined PRS configuration information to the LMF device or the terminal device via the non-UE associated message.

In some embodiments, the base station may send the cell specific PRS configuration information to the terminal device via a SIB message, or may send the cell specific PRS configuration information to the LMF device via a TRP information response, and then the LMF device sends the cell specific PRS configuration information to each terminal device, which is not limited in the present disclosure.

In some embodiments, the base station may send a SIB containing the PRS configuration information after receiving first indication information sent by the LMF device. The first indication information is used to indicate the PRS configuration information to be sent to the terminal device via the system information block (SIB). The SIB in the present disclosure may be a positioning SIB, or any other SIB that can carry the PRS configuration information, and the present disclosure is not limited thereto.

By implementing embodiments of the present disclosure, after receiving the PRS configuration information request sent by the communication device, the base station may return the PRS configuration information to the communication device. In this way, it enriches forms of requesting the PRS configuration information, provides more reliable and accurate PRS configuration information for positioning the terminal device, and improves the precision and reliability of the positioning result.

Figure 9:
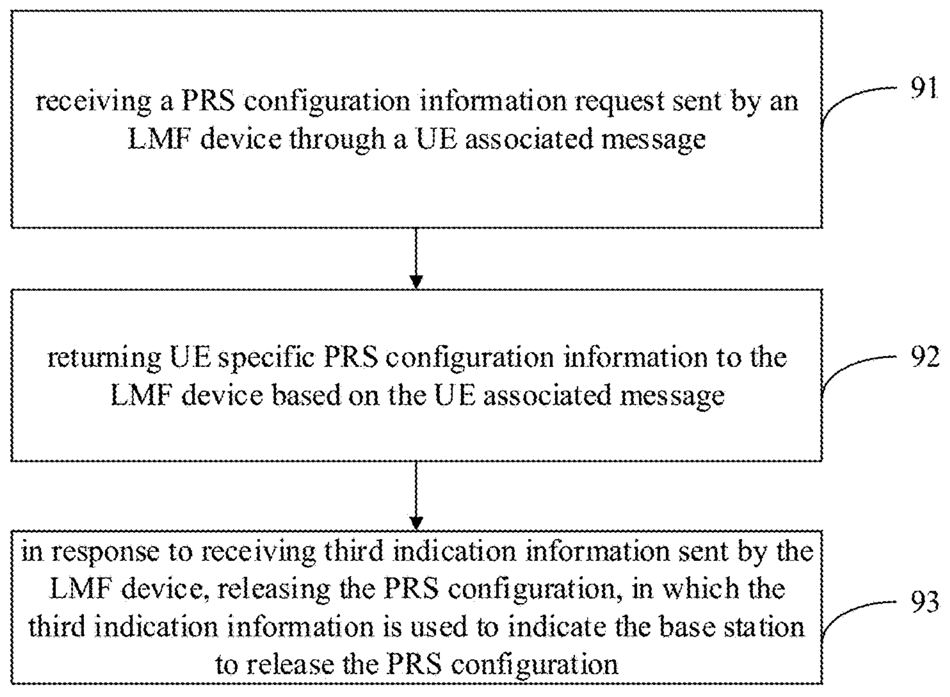
FIG. 9 is a schematic flowchart of a method for determining PRS configuration information provided by embodiments of the present disclosure.

Please refer to FIG. 9, which is a schematic flowchart of another method for determining PRS configuration information provided by embodiments of the present disclosure. The method is configured to be performed by a base station. As shown in FIG. 9, the method may include, but is not limited to, the following steps.

In step 91, a PRS configuration information request sent by an LMF device through a UE associated message is received.

In step 92, UE specific PRS configuration information is returned to the LMF device via the UE associated message.

In step 93, in response to receiving third indication information sent by the LMF device, PRS configuration is released. The third indication information is used to indicate the base station to release the PRS configuration.

It can be understood that after receiving the PRS configuration information returned by the base station through the UE associated message, the LMF device may send the information to a specified terminal device through an LPP message. Afterwards, after receiving second indication information to release the PRS configuration sent by the specified terminal device, the LMF device may send the third indication information to the base station to indicate the base station to release the PRS configuration. In this way, it not only achieves reliable positioning of the terminal device, but also prevents the PRS configuration information from occupying network device resources for a long time.

In some embodiments, in the present disclosure, after sending the PRS configuration information to the specified terminal device, the LMF device may also automatically trigger sending the third indication information to the base station to indicate the base station to release PRS configuration corresponding to the specified terminal device. For example, a time interval may be agreed according to a protocol, and after the PRS configuration information is sent to the specified terminal device and the specified time interval is reached, the LMF device may trigger sending the third indication information to the base station to indicate the base station to release the PRS configuration corresponding to the specified terminal device.

In some embodiments, the base station may also release the PRS configuration corresponding to the terminal device when receiving fourth indication information sent by the terminal device. The fourth indication information is used to indicate the base station to release the PRS configuration corresponding to the terminal device.

It should be noted that after the base station receives the PRS configuration information request sent by the LMF device through the UE associated message or receives the PRS configuration information request sent by the terminal, the base station may not be able to determine the PRS configuration information corresponding to the specified terminal device, or the determined PRS configuration information is not the UE specific PRS configuration information, then the base station may also return the PRS configuration information to the LMF device or the terminal device via a non-UE associated message, so that a plurality of terminal devices can perform positioning using the PRS configuration information.

By implementing embodiments of the present disclosure, after receiving the PRS configuration information request sent by the LMF device through the UE associated message, the base station may determine the PRS configuration information corresponding to the specified terminal device, and return the PRS configuration information to the LMF device via the UE associated message, and after receiving the third indication information sent by the LMF device, the base station releases the PRS configuration. In this way, it not only enriches forms of requesting the PRS configuration information, but also provides more reliable and accurate PRS configuration information for positioning the terminal device, improves the precision and reliability of the positioning result, and avoids the PRS configuration information to occupy device resources for a too long time.

Figure 10:
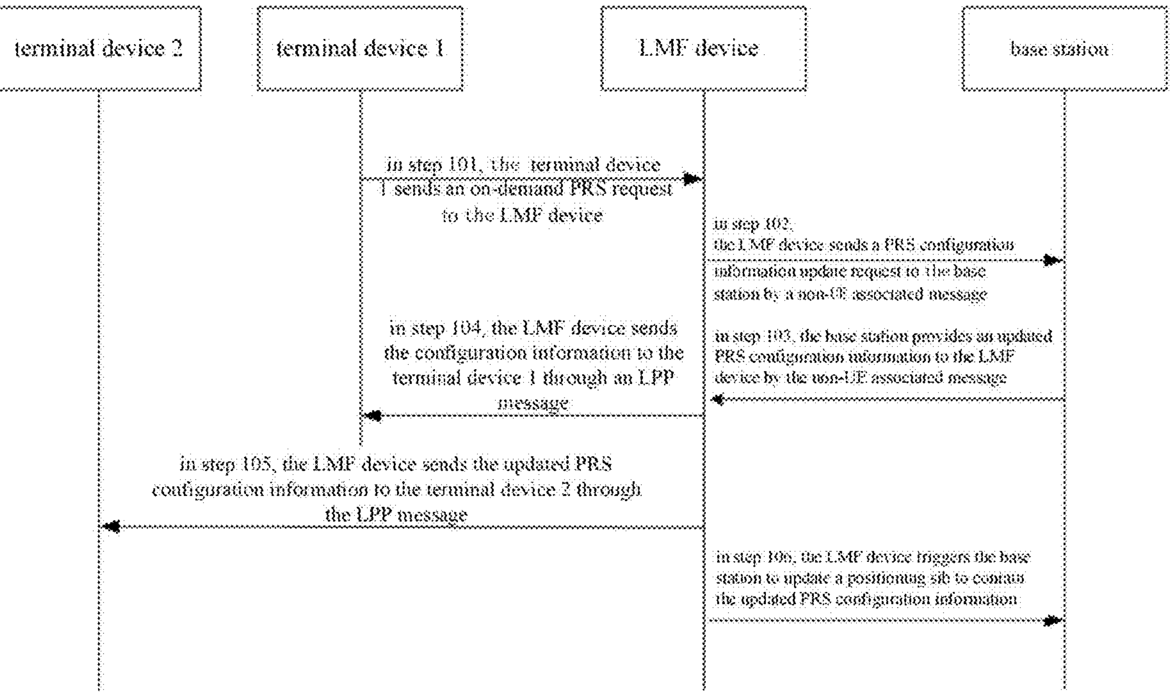
FIG. 10 is a schematic diagram of signaling interaction of a method for determining PRS configuration information provided by embodiments of the present disclosure.

Please refer to FIG. 10, which is a schematic diagram of signaling interaction of a method for determining PRS configuration information provided by embodiments of the present disclosure. As shown in FIG. 10, the method may include, but is not limited to, the following steps.

In step 101, a terminal device 1 sends an on-demand PRS request to an LMF device.

In step 102, the LMF device sends a PRS configuration information update request to a base station via a non-UE associated message.

In step 103, the base station provides an updated PRS configuration information to the LMF device via the non-UE associated message.

For example, the base station may send the updated PRS configuration information to the LMF device through a TRP information response message.

In step 104, the LMF device sends the configuration to the terminal device 1 through an LPP message.

In step 105, the LMF device sends the updated PRS configuration information to a terminal device 2 through the LPP message.

The terminal device 2 is any terminal device that is in a positioning process and uses the PRS configuration information of the base station.

In step 106, the LMF device triggers the base station to update a positioning sib to contain the updated PRS configuration information.

It should be noted that in this embodiment, the LMF device sending the PRS configuration information update request to the base station may also be automatically triggered by the LMF device, rather than being triggered after receiving the on-demand PRS request sent by the terminal device. For example, in order to update the PRS configuration information, or for a certain terminal device, the LMF device may send a non UE associated NRPPa message to the base station to request the update of the PRS configuration information, etc. The present disclosure is not limited thereto.

In addition, in this embodiment, after receiving the PRS configuration information returned by the base station through the non-UE associated message, the LMF device triggers the base station to send an updated positioning SIB, so that the updated positioning SIB contains the updated PRS configuration information, so that each terminal device may receive the updated PRS configuration information, thereby improving the positioning precision and reliability of each terminal device.

Figure 11:
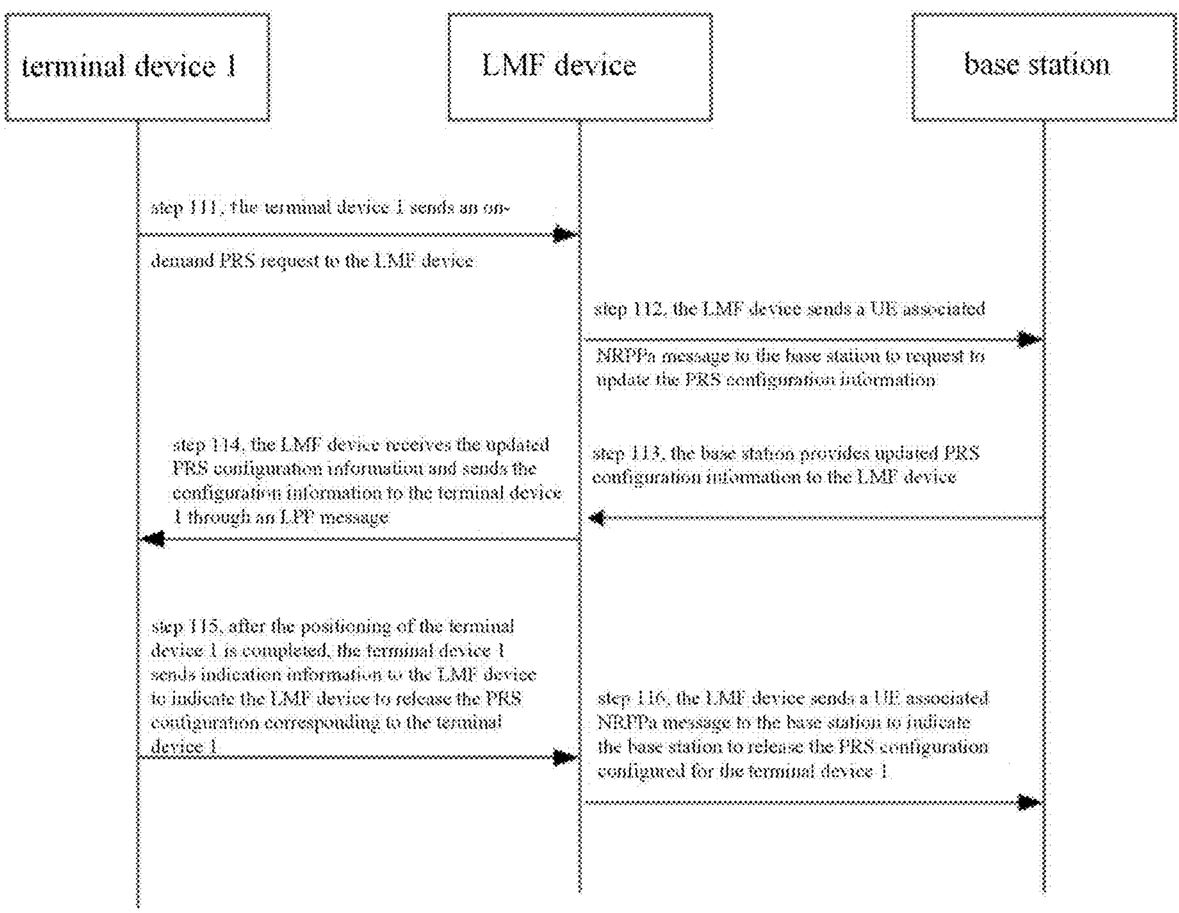
FIG. 11 is a schematic diagram of signaling interaction of another method for determining PRS configuration information provided by embodiments of the present disclosure.

Please refer to FIG. 11, which is a schematic diagram of signaling interaction of another method for determining PRS configuration information provided by embodiments of the present disclosure. As shown in FIG. 11, the method may include, but is not limited to, the following steps.

In step 111, a terminal device 1 sends an on-demand PRS request to an LMF device.

In step 112, the LMF device sends a UE associated NRPPa message to a base station to request to update the PRS configuration information.

For example, the LMF device may send the request through a positioning information request.

In step 113, the base station provides updated PRS configuration information to the LMF device.

For example, the base station may send the updated PRS configuration information to the LMF device through a positioning information response message.

In step 114, the LMF device receives the updated PRS configuration information and sends the configuration information to the terminal device 1 through an LPP message.

It should be noted that if the terminal device 2 is in a positioning process and uses the configuration information of the base station, the LMF device does not need to send the updated PRS configuration to the terminal device 2 through the LPP message.

In step 115, after the positioning of the terminal device 1 is completed, the terminal device 1 sends indication information to the LMF device to indicate the LMF device to release the PRS configuration corresponding to the terminal device 1.

In step 116, the LMF device sends a UE associated NRPPa message to the base station to indicate the base station to release the PRS configuration configured for the terminal device 1.

In the above embodiments provided by the present disclosure, the methods provided in embodiments of the present disclosure are introduced from perspectives of the LMF device, the terminal device and the base station respectively. In order to implement the various functions in the methods provided by the above embodiments of the present disclosure, the LMF device, the terminal device and the base station may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Figure 12:
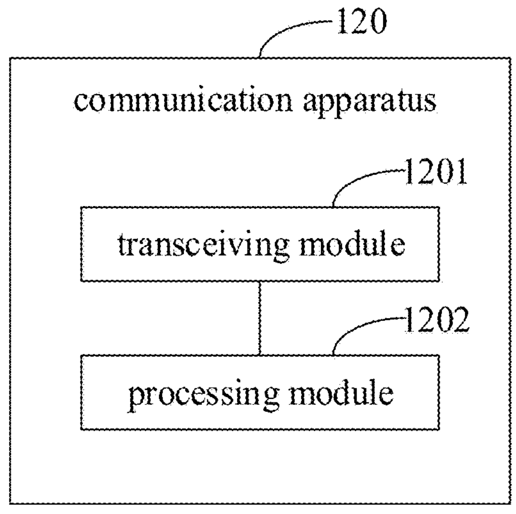
FIG. 12 is a schematic block diagram of a communication apparatus provided by embodiments of the present disclosure.

Please refer to FIG. 12, FIG. 12 is a schematic block diagram of a communication apparatus 120 provided by embodiments of the present disclosure. The communication apparatus 120 shown in FIG. 12 may include a transceiving module 1201 and a processing module 1202. The transceiving module 1201 may include a sending module and/or a receiving module, the sending module is configured to implement a sending function, and the receiving module is configured to implement a receiving function. The transceiving module 1201 may implement the sending function and/or the receiving function.

The communication apparatus 120 may be an LMF device (such as the LMF device in the foregoing method embodiments), an apparatus in the LMF device, or an apparatus that can be used in conjunction with the LMF device. Alternatively, the communication apparatus 120 may be a terminal device (such as the terminal device in the foregoing method embodiments), an apparatus in the terminal device, or an apparatus that can be used in conjunction with the terminal device. Alternatively, the communication apparatus 120 may also be a base station, an apparatus in the base station, or an apparatus that can be used in conjunction with the base station.

Specifically, if the communication apparatus 120 is an LMF device (such as the LMF device in the aforementioned method embodiments):

The transceiving module 1201 is configured to send a PRS configuration information request to a base station via a non-UE associated message or a UE associated message.

In some embodiments, the transceiving module 1201 is specifically configured to:

- request the PRS configuration information from the base station via a transmission reception point (TRP) information request message; or
- request the PRS configuration information from the base station via a specified positioning information request message; or
- request the PRS configuration information from the base station via a specified UE associated message.

In some embodiments, the transceiving module 1201 is specifically configured to:

- send an on-demand PRS configuration information request to the base station via the non-UE associated message or the UE associated message; or
- in response to receiving an on-demand PRS configuration information request sent by a terminal device, send a PRS configuration information update request to the base station via the UE associated message; or
- send an initial PRS configuration information request to the base station via the non-UE associated message or the UE associated message.

In some embodiments, the above transceiving module 1201 is specifically configured to: in response to a number of received on-demand PRS configuration information requests sent by terminal devices being less than or equal to a threshold value, send the PRS configuration information request to the base station via the UE associated message.

In some embodiments, the transceiving module 1201 is specifically configured to: in response to a number of received on-demand PRS configuration information requests sent by terminal devices being greater than a threshold value, send the PRS configuration information request to the base station via the non-UE associated message.

In some embodiments, the transceiving module 1201 is specifically configured to: determine common PRS configuration information according to a plurality of pieces of on-demand PRS configuration information; and send a common PRS configuration information request to the base station via the non-UE associated message.

In some embodiments, the transceiving module 1201 is specifically configured to:

- in response to requested PRS configuration information being an aperiodic PRS or a semi-persistent PRS, send the PRS configuration information request to the base station via the UE associated message; or
- in response to requested PRS configuration information being a periodic PRS, send the PRS configuration information request to the base station via the non-UE associated message.

In some embodiments, the transceiving module 1201 is further configured to: in response to receiving the PRS configuration information returned by the base station through the non-UE associated message, send first indication information to the base station. The first indication information is used to indicate the base station to send the PRS configuration information to the terminal device via a system information block (SIB).

In some embodiments, the transceiving module 1201 is further configured to:

- receive the PRS configuration information returned by the base station through the non-UE associated message; and
- send the PRS configuration information to a first specified terminal device by a long term evolution positioning protocol (LPP) message.

The first specified terminal device is a terminal device that sends an on-demand PRS configuration information request to the LMF device, and/or a terminal device that has been configured with PRS configuration information corresponding to the base station.

In some embodiments, the transceiving module 1201 is further configured to:

- receive the PRS configuration information returned by the base station through the UE associated message; and
- send the PRS configuration information to a second specified terminal device.

The second specified terminal device is a terminal device that sends an on-demand PRS configuration information request to the LMF device.

In some embodiments, the transceiving module is further configured to: receive second indication information sent by the second specified terminal device. The second indication information is used to indicate the LMF device to release PRS configuration corresponding to the second specified terminal device.

The apparatus further includes a processing module configured to release the PRS configuration corresponding to the second specified terminal device.

In some embodiments, the transceiving module 1201 is further configured to: send third indication information to the base station. The third indication information is used to indicate the base station to release the PRS configuration corresponding to the second specified terminal device.

In the communication apparatus provided by the present disclosure, the LMF device may send the PRS configuration information request to the base station via the non-UE associated message or the UE associated message to obtain a plurality of types of PRS configuration information, which not only enriches forms of requesting the PRS configuration information, but also provides more reliable and accurate PRS configuration information for positioning the terminal device, thereby improving the precision and reliability of the positioning result.

Alternatively, if the communication apparatus 120 is a terminal device:

The transceiving module 1201 is configured to send an on-demand PRS configuration information request to a network device, and the network device is an LMF device or a base station.

The transceiving module 1201 is further configured to receive PRS configuration information returned by the network device.

In some embodiments, the network device is the LMF, and the transceiving module 1201 is specifically configured to: receive the PRS configuration information returned by the LMF device through a long term evolution positioning protocol (LPP) message.

In some embodiments, the transceiving module 1201 is further configured to: in response to an end of a positioning process, send second indication information to the LMF device. The second indication information is used to indicate the LMF device to release PRS configuration corresponding to the terminal device.

In some embodiments, the transceiving module 1201 is further configured to: in response to an end of a positioning process, send fourth indication information to the base station. The fourth indication information is used to indicate the base station to release PRS configuration corresponding to the terminal device.

In some embodiments, the network device is the base station, and the transceiving module 1201 is further configured to: receive the PRS configuration information returned by the base station through a SIB.

In the communication apparatus provided by the present disclosure, the terminal device first sends the on-demand PRS configuration information request to the LMF device, performs positioning based on the PRS configuration information after receiving the PRS configuration information returned by the LMF device, and after ending the positioning, sends the second indication information to the LMF device to indicate the LMF device to release the PRS configuration corresponding to the terminal device. In this way, it not only enriches forms of requesting the PRS configuration information, but also provides more reliable and accurate PRS configuration information for positioning the terminal device, improves the precision and reliability of the positioning result, and avoids the PRS configuration information to occupy device resources for a too long time.

Alternatively, if the communication apparatus 120 is a base station.

The transceiving module 1201 is configured to receive a PRS configuration information request sent by a communication device.

The transceiving module 1201 is further configured to return PRS configuration information to the communication device.

The communication device is an LMF device or a terminal device, and the PRS configuration information request sent by the LMF device is a non-UE associated message or a UE associated message.

In some embodiments, the communication apparatus 120 further includes:

- a processing module 1202 configured to, in response to the PRS configuration information request being the UE associated message, determine the PRS configuration information being UE specific PRS configuration information; or
- the processing module 1202 is further configured to, in response to the PRS configuration information request being the non-UE associated message, determine the PRS configuration information being cell specific PRS configuration information.

In some embodiments, the transceiving module 1201 is specifically configured to:

- in response to the PRS configuration information request being the UE associated message, return UE specific PRS configuration information to the communication device via the UE associated message; or
- in response to the PRS configuration information request being the non-UE associated message, return cell specific PRS configuration information to the communication device via the non-UE associated message.

In some embodiments, the transceiving module 1201 is further configured to:

- receive first indication information sent by the LMF device, in which the first indication information is used to indicate the PRS configuration information to be sent to the terminal device via a system information block (SIB); and
- send the SIB containing the PRS configuration information.

In some embodiments, the transceiving module 1201 is further configured to: in response to receiving third indication information sent by the LMF device, or receiving fourth indication information sent by the terminal device, release the PRS configuration. The third indication information or the fourth indication information is used to indicate the base station to release the PRS configuration.

Through the communication apparatus provided by the present disclosure, after receiving the PRS configuration information request sent by the communication device, the base station may return the PRS configuration information to the communication device. In this way, it enriches forms of requesting the PRS configuration information, provides more reliable and accurate PRS configuration information for positioning the terminal device, and improves the precision and reliability of the positioning result.

Figures 13, 14:
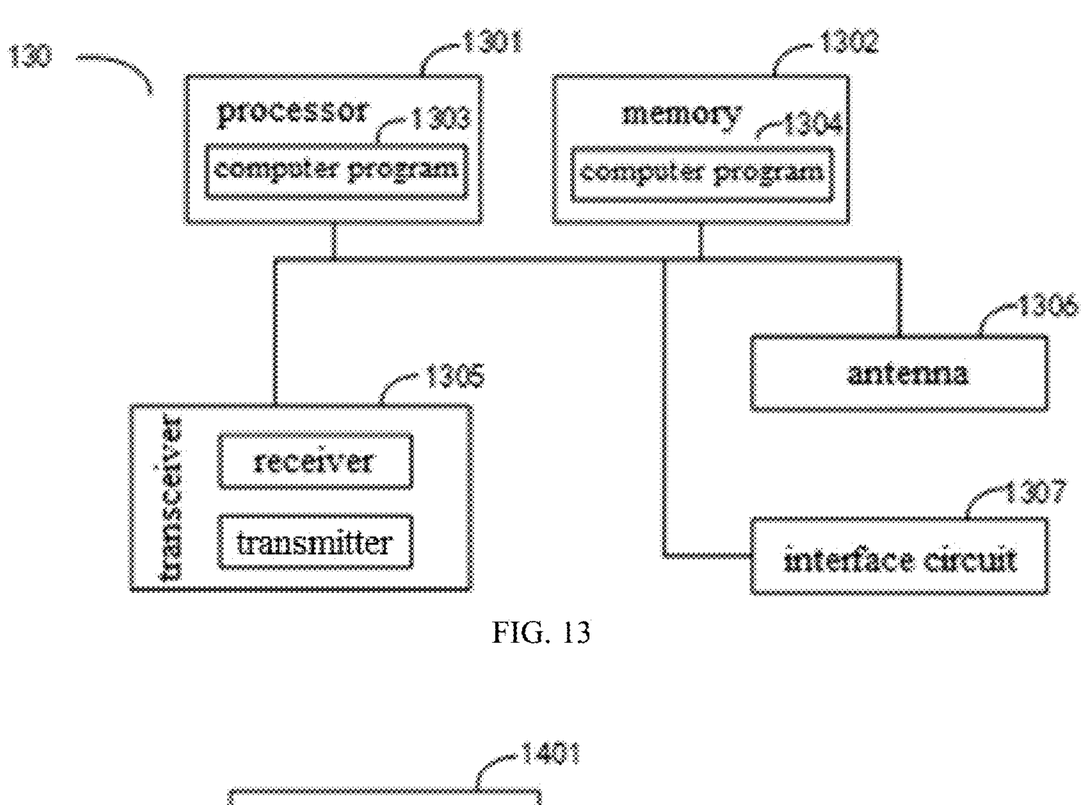
FIG. 13 is a schematic block diagram of another communication device provided by embodiments of the present disclosure.
FIG. 14 is a schematic block diagram of a chip provided by embodiments of the present disclosure.

Please refer to FIG. 13, FIG. 13 is a schematic block diagram of another communication device 130 provided by embodiments of the present disclosure. The communication device 130 may be a network device, may also be a terminal device (such as the terminal device in the foregoing method embodiments), may also be a chip, a chip system, or a processor that supports the network device to implement the above method, and may also be a chip, a chip system, or a processor that supports the terminal device to implement the above method. The device may be configured to implement the method as described in the above method embodiments, and for details, reference may be made to the descriptions in the above method embodiments.

The communications device 130 may include one or more processors 1301. The processor 1301 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, the terminal device, a terminal device chip, a DU or a CU, etc.) execute computer programs, and process data of computer programs.

In some embodiments, the communication device 130 may further include one or more memories 1302 having stored therein a computer program 1304. The processor 1301 executes the computer program 1304, to cause the communication device 130 to implement the method as described in the above method embodiments. In some embodiments, the memory 1302 may have stored therein data. The communication device 130 and the memory 1302 may be set separately or integrated together.

In some embodiments, the communication device 130 may further include a transceiver 1305 and an antenna 1306. The transceiver 1305 may be called a transceiving element, a transceiving machine, a transceiving circuit or the like, for implementing a transceiving function. The transceiver 1305 may include a receiver and a transmitter. The receiver may be called a receiving machine, a receiving circuit or the like, for implementing a receiving function. The transmitter may be called a sending machine, a sending circuit or the like for implementing a sending function.

In some embodiments, the communication device 130 may further include one or more interface circuits 1307. The interface circuit 1307 is configured to receive a code instruction and transmit the code instruction to the processor 1301. The processor 1301 runs the code instruction to enable the communication device 130 to execute the methods as described in the foregoing method embodiments.

The communication device 130 is the LMF device (such as the terminal device in the foregoing method embodiments): the transceiver 1305 is configured to execute the step 21 in FIG. 2, the step 31, the step 32 and the step 33 in FIG. 3, and the step 41 and the step 42 in FIG. 4, etc.

The communication device 130 is the terminal device: the transceiver 1305 is configured to execute the step 61 and the step 62 in FIG. 6, the step 71, the step 72 and the step 73 in FIG. 7, etc.

The communication device 130 is the base station: the transceiver 1305 may be configured to execute the step 81 and the step 82 in FIG. 8, the step 91 and the step 92 in FIG. 9. The processor 1301 may be configured to execute the step 93 in FIG. 9, etc.

In an implementation, the processor 1301 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read and write codes/data, or the above transceiving circuit, interface or interface circuit may be configured to transmit or transfer signals.

In an implementation, the processor 1301 may has stored therein a computer program 1303 that, when run on the processor 1301, causes the communication device 130 to implement the method as described in the foregoing method embodiments. The computer program 1303 may be solidified in the processor 1301, and in this case, the processor 1301 may be implemented by a hardware.

In an implementation, the communication device 130 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), a nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and a structure of the communication device is not limited by FIG. 13. The communication device may be a stand-alone device or may be a part of a larger device. For example, the communication device may be:

(1) a stand-alone integrated circuit (IC), or a chip, or a chip system or a sub system;

(2) a set of one or more ICs, optionally, the set of ICs may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handheld machine, a mobile unit, a vehicle device, a network device, a cloud device, an artificial intelligence device, etc.;

(6) others.

For the case where the communication device may be a chip or a chip system, reference may be made to a schematic structural diagram of the chip shown in FIG. 14. The chip shown in FIG. 14 includes a processor 1401 and an interface 1402. In the chip, one or more processors 1401 may be provided, and more than one interface 1402 may be provided.

For the case where the chip is used to implement functions of the LMF device in embodiments of the present disclosure:

the interface 1402 is configured to execute the step 21 in FIG. 2, the step 31, the step 32 and the step 33 in FIG. 3, the step 41 and the step 42 in FIG. 4, etc.

For the case where the chip is used to implement functions of the terminal device in embodiments of the present disclosure:

The interface 1402 is configured to execute the step 61 and the step 62 in FIG. 6, the step 71, the step 72 and the step 73 in FIG. 7, etc.

For the case where the chip is used to implement functions of the base station in embodiments of the present disclosure:

The interface 1402 is configured to execute the step 81 and the step 82 in FIG. 8, the step 91 and the step 92 in FIG. 9, etc.

In some embodiments, the chip further includes a memory 1403 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such implementation should not be understood as beyond the protection scope of embodiments of the present disclosure.

Embodiments of the present disclosure also provide a system for determining positioning reference signaling configuration information. The system includes the communication apparatus as the terminal device and the communication apparatus as the network device as described in the aforementioned embodiments in FIG. 12, or the system includes the communication device as the terminal device and the communication device as the network device as described in the aforementioned embodiments in FIG. 13.

The present disclosure also provides a readable storage medium having stored thereon instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or part of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one web site, computer, server or data center to another web site, computer, server or data center by a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)) etc.

Those of ordinary skill in the art can understand that the first, second, and other numeral numbers involved in the present disclosure are only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

The correspondence shown in each table in the present disclosure may be configured or predefined. The values of information in each table are just examples, and may be configured as other values, which are not limited in the present disclosure. When configuring a correspondence between the information and various parameters, it is not necessary to configure all the correspondences shown in the tables. For example, the correspondences shown in some rows of the tables in the present disclosure may not be configured. For another example, appropriate deformations or adjustments (such as splitting, merging, and so on) can be made based on the above table. The names of parameters shown in the titles of the above tables may also adopt other names understandable by the communication device, and the values or representations of the parameters may also be other values or representations understandable by the communication device. When the above tables are implemented, other data structures may also be used, for example, arrays, queues, containers, stacks, linear tables, pointers, linked lists, trees, graphs, structural body, classes, heaps, or hash tables may be used.

The term "predefinition" in the present disclosure may be understood as definition, pre-definition, storage, pre-storage, pre-negotiation, pre-configuration, curing, or pre-firing.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such implementation should not be considered beyond the scope of the present disclosure.

Those skilled in the art can clearly understand that for the convenience and brevity of the description, the specific working process of the above-described system, device and unit may refer to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for determining positioning reference signaling (PRS) configuration information, performable by a location management function (LMF) device, the method comprising:

in response to receiving an on-demand PRS configuration information request sent by a terminal device, sending a PRS configuration information request to a base station via a non-user equipment (UE) associated message or a UE associated message;

in response to the PRS configuration information request being sent via the UE associated message, receiving UE specific PRS configuration information returned by the base station via a UE associated message; or in response to the PRS configuration information request being sent via the non-UE associated message, receiving cell specific PRS configuration information returned by the base station via a non-UE associated message, further comprising:

in response to receiving the PRS configuration information returned by the base station via the non-UE associated message, sending the PRS configuration information to a first specified terminal device via a long term evolution positioning protocol (LPP) message, wherein the first specified terminal device is a terminal device that sends an on-demand PRS configuration information request to the LMF device, and/or a terminal device that has been configured with PRS configuration information corresponding to the base station;

wherein sending the PRS configuration information request to the base station via the non-UE associated message or the UE associated message comprises:

in response to a number of received on-demand PRS configuration information requests sent by terminal devices being greater than a threshold value, sending the PRS configuration information request to the base station via the non-UE associated message; or in response to a number of received on-demand PRS configuration information requests sent by terminal devices being less than or equal to a threshold value, sending the PRS configuration information request to the base station via the UE associated message.

2. The method according to claim 1, wherein sending the PRS configuration information request to the base station via the non-UE associated message or the UE associated message comprises at least one of the following:

requesting the PRS configuration information from the base station via a transmission reception point (TRP) information request message;

requesting the PRS configuration information from the base station via a specified positioning information request message; or requesting the PRS configuration information from the base station via a specified UE associated message.

3. The method according to claim 1, wherein sending the PRS configuration information request to the base station via the non-UE associated message or the UE associated message comprises at least one of the following:

sending an on-demand PRS configuration information request to the base station via the non-UE associated message or the UE associated message; or sending an initial PRS configuration information request to the base station via the non-UE associated message or the UE associated message.

4. The method according to claim 1, wherein sending the PRS configuration information request to the base station via the non-UE associated message comprises:

determining common PRS configuration information according to a plurality of pieces of on-demand PRS configuration information; and sending a common PRS configuration information request to the base station via the non-UE associated message.

5. The method according to claim 1, wherein sending the PRS configuration information request to the base station via the non-UE associated message or the UE associated message comprises:

in response to requested PRS configuration information being an aperiodic PRS or a semi-persistent PRS, sending the PRS configuration information request to the base station via the UE associated message; or in response to requested PRS configuration information being a periodic PRS, sending the PRS configuration information request to the base station via the non-UE associated message.

6. The method according to claim 1, further comprising:

in response to receiving the PRS configuration information returned by the base station through the non-UE associated message, sending first indication information to the base station, wherein the first indication information is used to indicate the base station to send the PRS configuration information to the terminal device via a system information block (SIB).

7. The method according to claim 1, further comprising:

receiving the PRS configuration information returned by the base station through the UE associated message; and sending the PRS configuration information to a second specified terminal device, wherein the second specified terminal device is a terminal device that sends an on-demand PRS configuration information request to the LMF device.

8. The method according to claim 7, further comprising:

receiving second indication information sent by the second specified terminal device, wherein the second indication information is used to indicate the LMF device to release PRS configuration corresponding to the second specified terminal device.

9. The method according to claim 8, further comprising:

sending third indication information to the base station, wherein the third indication information is used to indicate the base station to release the PRS configuration corresponding to the second specified terminal device.

10. A communication device, comprising:

a processor; and a memory having stored therein a computer program, wherein the processor is configured to execute the computer program stored in the memory, to cause the device to implement the method according to claim 1.

11. A method for determining positioning reference signaling configuration information, configured to be performed by a terminal device and comprising:

sending an on-demand PRS configuration information request to a network device, wherein the network device is an LMF device, wherein the LMF device is configured to send a PRS configuration information request to a base station via a non-UE associated message in a case where a number of received on-demand PRS configuration information requests sent by terminal devices is greater than a threshold value, or the LMF device is configured to send a PRS configuration information request to a base station via a UE associated message in a case where a number of received on-demand PRS configuration information requests sent by terminal devices is less than or equal to a threshold value; and receiving PRS configuration information returned by the LMF device through a long term evolution positioning protocol (LPP) message;

wherein receiving the PRS configuration information returned by the LMF device comprises:

in response to the PRS configuration information request being sent via the UE associated message, receiving UE specific PRS configuration information returned by the LMF device; or in response to the PRS configuration information request being sent via the non-UE associated message, receiving cell specific PRS configuration information returned by the LMF device.

12. The method according to claim 11, further comprising:

in response to an end of a positioning process, sending second indication information to the LMF device, wherein the second indication information is used to indicate the LMF device to release PRS configuration corresponding to the terminal device; or in response to an end of a positioning process, sending fourth indication information to the base station, wherein the fourth indication information is used to indicate the base station to release PRS configuration corresponding to the terminal device.

13. The method according to claim 11, wherein the network device is the base station, and receiving the PRS configuration information returned by the network device comprises:

receiving the PRS configuration information returned by the base station through a SIB.

14. A communication device, comprising:

a processor; and a memory having stored therein a computer program, wherein the processor is configured to execute the computer program stored in the memory, to cause the device to implement the method according to claim 11.

15. A method for determining positioning reference signaling configuration information, configured to be performed by a base station and comprising:

receiving a PRS configuration information request sent by a communication device; and returning the PRS configuration information to the communication device;

wherein the communication device is an LMF device, and the PRS configuration information request sent by the LMF device is a non-UE associated message or a UE associated message;

wherein the non-UE associated message is sent by the LMF device in a case where a number of received on-demand PRS configuration information requests sent by terminal devices is greater than a threshold value, and the UE associated message is sent by the LMF device in a case where a number of received on-demand PRS configuration information requests sent by terminal devices is less than or equal to a threshold value;

wherein returning the PRS configuration information to the communication device comprises:

in response to the PRS configuration information request being the UE associated message, returning UE specific PRS configuration information to the communication device via the UE associated message; or in response to the PRS configuration information request being the non-UE associated message, returning cell specific PRS configuration information to the communication device via the non-UE associated message.

16. The method according to claim 15, further comprising:

in response to the PRS configuration information request being the UE associated message, determining the PRS configuration information being UE specific PRS configuration information; or in response to the PRS configuration information request being the non-UE associated message, determining the PRS configuration information being cell specific PRS configuration information.

17. The method according to claim 15, further comprising:

receiving first indication information sent by the LMF device, wherein the first indication information is used to indicate the PRS configuration information to be sent to the terminal device via a system information block (SIB); and sending the SIB containing the PRS configuration information.

18. The method according to claim 15, further comprising:

in response to receiving third indication information sent by the LMF device, or receiving fourth indication information sent by the terminal device, releasing the PRS configuration;

wherein the third indication information or the fourth indication information is used to indicate the base station to release the PRS configuration.

19. A communication device, comprising:

a processor; and a memory having stored therein a computer program, wherein the processor is configured to execute the computer program stored in the memory, to cause the device to implement the method according to claim 15.

* * * * *